United States Patent [19]

O'Neil-Bell et al.

[11] Patent Number: 5,270,135
[45] Date of Patent: Dec. 14, 1993

[54] ARTICLES INCLUDING A CERAMIC MEMBER AND A METAL MEMBER BONDED TOGETHER

[75] Inventors: Christopher O'Neil-Bell, Great Sankey; Stuart McLachlan, Northwich, both of United Kingdom

[73] Assignee: Chloride Silent Power, Ltd., Cheshire, United Kingdom

[21] Appl. No.: 784,391

[22] PCT Filed: Jun. 28, 1990

[86] PCT No.: PCT/GB90/00999
§ 371 Date: Dec. 31, 1991
§ 102(e) Date: Dec. 31, 1991

[87] PCT Pub. No.: WO91/00255
PCT Pub. Date: Jan. 10, 1991

[30] Foreign Application Priority Data

Jul. 4, 1989 [GB] United Kingdom ............ 8915316

[51] Int. Cl.⁵ .................................. H01M 2/08
[52] U.S. Cl. ........................... 429/104; 429/174; 29/623.2; 29/623.4; 29/730; 428/653
[58] Field of Search ........... 429/104, 174; 29/623.4, 29/730, 623.2; 428/653; 156/73.1, 379.7, 580.1

[56] References Cited

U.S. PATENT DOCUMENTS

| | | | |
|---|---|---|---|
| 4,530,151 | 7/1985 | Kagawa et al. | 429/104 X |
| 4,631,685 | 12/1986 | Peter | 156/580.1 X |
| 4,772,293 | 9/1988 | Bugden et al. | 429/104 X |
| 4,804,131 | 2/1989 | de Meulenaer et al. | 228/110 |

FOREIGN PATENT DOCUMENTS

| | | |
|---|---|---|
| 0184299 | 6/1986 | European Pat. Off. |
| 981741 | 1/1965 | United Kingdom . |
| 1117760 | 6/1968 | United Kingdom . |
| 1129951 | 10/1968 | United Kingdom . |
| 1586073 | 3/1981 | United Kingdom . |
| 2206726 | 1/1989 | United Kingdom . |

OTHER PUBLICATIONS

Perry, *IBM Technical Disclosure Bulletin*, vol. 21, #8, Jan. 1979, p. 3254, "Aluminum Spacer Bond Medium".
Tetsuji, *Patent Abstracts of Japan*, For Japanese 63/188483, Aug. 1988.

*Primary Examiner*—Stephen Kalafut
*Attorney, Agent, or Firm*—Finnegan, Henderson, Farabow, Garrett & Dunner

[57] ABSTRACT

An article includes a ceramic member (5) and a composite member (9) bonded together. The composite member is formed of a substrate member and a deformable metal layer which is mechanically fixed to the substrate member. The substrate member is formed of a material which is harder than the deformable metal. The ceramic member and the deformable metal layer of the composite member are hermetically sealed together by a solid phase bond formed by ultrasonic welding.

50 Claims, 5 Drawing Sheets

ARTICLES INCLUDING A CERAMIC MEMBER AND A METAL MEMBER BONDED TOGETHER

This invention relates to bonds between metals and ceramic or vitreous materials and in particular to articles including a ceramic or vitreous member and a metal member bonded together to form a seal and to a method of securing a metal member to a ceramic or vitreous member to form a seal.

It is often necessary for a metal member to be bonded to a ceramic member to form a seal, a particular example being in the manufacture of sodium/sulphur cells used as secondary batteries.

Unlike conventional lead acid batteries in which a liquid electrolyte—dilute sulphuric acid—separates two solid electrodes, in a sodium/sulphur cell a solid electrolyte—generally beta alumina—separates two liquid electrodes, namely liquid sulphur and liquid sodium electrodes.

Figure 1:
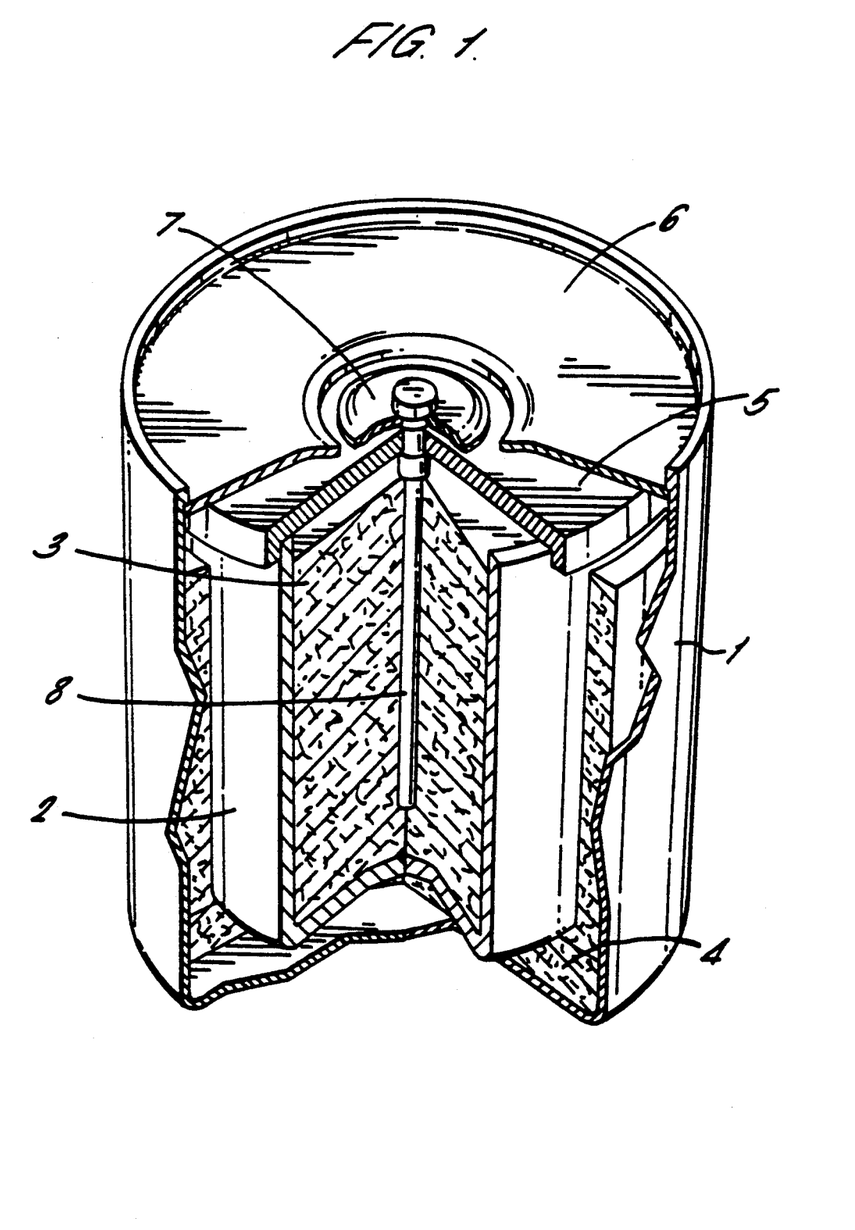
FIG. 1 shows a prior art sodium/sulphur cell as described hereinbefore.

Such a sodium/sulphur cell is shown in FIG. 1 of the drawings which is a perspective view of the cell with part broken away. As shown the cell comprises a case 1 of, for example steel, in the form of a right circular cylinder and containing a solid electrolyte cup 2 of beta alumina, the cup 2 containing a sodium electrode 3, while a space between the case 1 and the cup 2 contains a sulphur electrode 4. For use, the cell is maintained at a temperature of between 300° C. and 400° C. such that the sodium and sulphur electrodes 3 and 4 are in liquid form.

The open end of the cup 2 is closed by an insulating disc 5 of alpha alumina, while the case 1 is closed by an annular sealing steel disc 6.

The case 1 serves as a terminal for the sulphur electrode 4, while the sodium electrode 3 contains an elongate metal current collector 8 which extends axially of the case 1 out through the disc 5 where it is connected to a centre terminal disc 7 mounted on the disc 5, the necessary connections being made by welding.

As sulphur is essentially non-conducting a means of making an electrical connection between the case 1 and the cup 2 has to be provided, and this is generally achieved by forming the sulphur electrode 4 as a carbon fibre mat impregnated with sulphur.

It will be appreciated that with such a cell the sodium and sulphur electrodes 3 and 4 can have their locations reversed.

With such a cell it is necessary for the alpha alumina disc 5 to seal the open end of the beta alumina cup 2 and this is generally effected by a glazing technique. It is also necessary for the disc 6 and the terminal disc 7 to be secured to the alpha alumina disc 5 to form seals, and since alpha alumina is both ionically and electronically insulating, diffusion bonding is generally used.

The types of diffusion bonding used fall into two broad classes, namely "low temperature" using temperatures 350° C. and 650° C., and "high temperature" using temperatures above 800° C. However both of these methods have disadvantages. For example, both may require the use of a separate intermediate deformable sealing member between the metal and ceramic members to be bonded.

Because of the temperatures used in the different processes, low temperature bonding is carried out after the alpha alumina disc 5 is glazed to the beta alumina cup 2. The temperatures used in the low temperature bonding can induce failure of the glazing seal during subsequent manufacturing operations or during use of the cell. Furthermore the presence of a beta alumina cup further complicates the process of the diffusion bonding between the alpha alumina disc 5 and either one of the disc 6 or the terminal 7.

High temperature bonding requires the use of materials capable of withstanding the high temperatures used and the thermal stresses produced during the bonding operation. However high temperature bonding can be carried out prior to connection of the alpha alumina disc 5 to the beta alumina cup 2 and thus the stress level in this glazing connection can be kept to a minimum.

GB111760 (Philips) discloses the ultrasonic welding of ductile metals such as aluminium or copper to hard materials such as glass and other vitreous or ceramic substances. A foil of ductile metal, such as aluminium foil of thickness 0.1 mm or less, is pressed against a layer of eg. ceramic between a sonotrode and a rigid anvil. The sonotrode is in the form of a body of revolution which rotates with this axis of revolution parallel to the ceramic layer. The sonotrode is vibrated at an ultrasonic frequency in the direction of its axis of revolution and is in contact with the metal foil. A layer of resilient material is provided between the ceramic and the anvil. The instantaneous contact surface of the anvil with the workpiece moves at the same speed and in the same direction as the instantaneous contact surface of the sonotrode. Uninterrupted welding seams can thus be produced between a foil of ductile metal and a layer of hard and brittle material.

It is an object of the present invention to provide an improved article including a ceramic or vitreous member and a metal member in which the ceramic or vitreous member and the metal member are bonded together.

According to a first aspect of the present invention there is provided an article including a ceramic or vitreous member and a composite member, said composite member comprising a substrate member and a deformable metal layer mechanically fixed to said substrate member, said substrate member being formed of a material which is harder than said deformable metal wherein said ceramic or vitreous member and said deformable metal layer are bonded together by a solid phase bond formed by ultrasonic welding.

In contrast to the disclosure of GB1117760, the article according to the present invention includes a composite member bonded to the ceramic or vitreous member. The composite member comprises a substrate member and a deformable metal layer, the substrate member being formed of a material which is harder than said deformable metal. In this way, the structural integrity of the article is improved.

Advantageously the substrate member is formed of a metal, such as steel. The deformable metal can be chosen to have other advantageous properties such as resistance to corrosion.

According to a second aspect of the present invention there is provided a method of bonding a ceramic or vitreous member to a composite member, said composite member comprising a substrate member and a deformable metal layer mechanically fixed to said substrate member, said substrate member being formed of a material which is harder than said deformable metal, the method including the steps of positioning said ceramic or vitreous member and said composite member so that said ceramic or vitreous member and said composite member so that said ceramic or vitreous member is adjacent said deformable metal layer and securing said ceramic or vitreous member and said deformable metal layer together by ultrasonic welding.

The method of this aspect of the present invention allows a ceramic or vitreous member to be bonded to a substrate member at ambient temperature. This can have advantages over other methods of forming a bond between two members, such as diffusion bonding, which require elevated temperatures.

According to a third aspect of the present invention there is provided a sodium/sulphur cell including a ceramic or vitreous member and a composite member, said composite member comprising a substrate member and a deformable metal layer mechanically fixed to said substrate member, said substrate member being formed of a material which is harder than said deformable metal wherein said ceramic or vitreous member and said deformable metal layer are bonded together by a solid phase bond formed by ultrasonic welding.

Advantageously the substrate member is formed of a metal, such as steel, which provides structural integrity of the sodium/sulphur cell. The deformable metal can be aluminium or some other metal which has advantageous properties such as resistance to corrosion. In particular, the cases of the sodium/sulphur cells can be formed of steel having an anti-corrosion layer on its inner surface.

It has been ascertained that if a composite comprising aluminium and another metal is used for components of a sodium/sulphur cell, for example the case, then by the method of ultrasonic welding a solid phase bond can be formed between a ceramic member and the aluminium of the composite as a result of ultrasonic deformation of the aluminium. The bond provides a hermetic seal between the ceramic member and the composite and there is no need to use any other deformable intermediate members or bonding aids between the metal and ceramic members.

Accordingly, a fourth aspect of the present invention provides a method of producing a sodium/sulphur cell, the cell including a ceramic or vitreous member and a composite member, said composite member comprising a substrate member and a deformable metal layer mechanically fixed to said substrate member, said substrate member being formed of a material which is harder than said deformable metal, the method including the steps of positioning said ceramic or vitreous member and said composite member so that said ceramic or vitreous member is adjacent said deformable metal layer and securing said ceramic or vitreous member and said deformable metal layer together by ultrasonic welding.

As indicated, the step of ultrasonic welding can be carried out at ambient temperature. Accordingly, in comparison with prior art methods of bonding, the number of thermal cycles experienced by the different parts of the cell are reduced. In particular, the stress level in the glazing seal is not so great as that caused by the elevated temperatures required for diffusion bonding, which even for the "low temperature" diffusion bonding is above 300° C. The method has the further advantages of speed (less than one second required per operation) and simplicity. Notably, the structure of the composite member both enables the ultrasonic welding operation to be effected and provides a structure in which the surface properties of the substrate member can be improved by the presence of the deformable metal layer.

According to a fifth aspect of the present invention there is provided an apparatus for manufacturing an article including a ceramic or vitreous member and a composite member, said composite member comprising a substrate member and a deformable metal layer mechanically fixed to said substrate member, said substrate member being formed of a material which is harder than said deformable metal, the apparatus comprising means for positioning said ceramic or vitreous member and said composite member relative to one another such that said ceramic or vitreous member is adjacent said deformable metal layer and means for transmitting energy ar an ultrasonic frequency to said deformable metal layer through said substrate member whereby said deformable metal layer and said ceramic or vitreous member are caused to vibrate relative to one another, forming a solid phase bond there between. The apparatus according to this aspect of the present invention allows the methods of the present invention to be effected Embodiments of the present invention will now be described by way of example only and with reference to the accompanying drawings in which:

Figure 2:
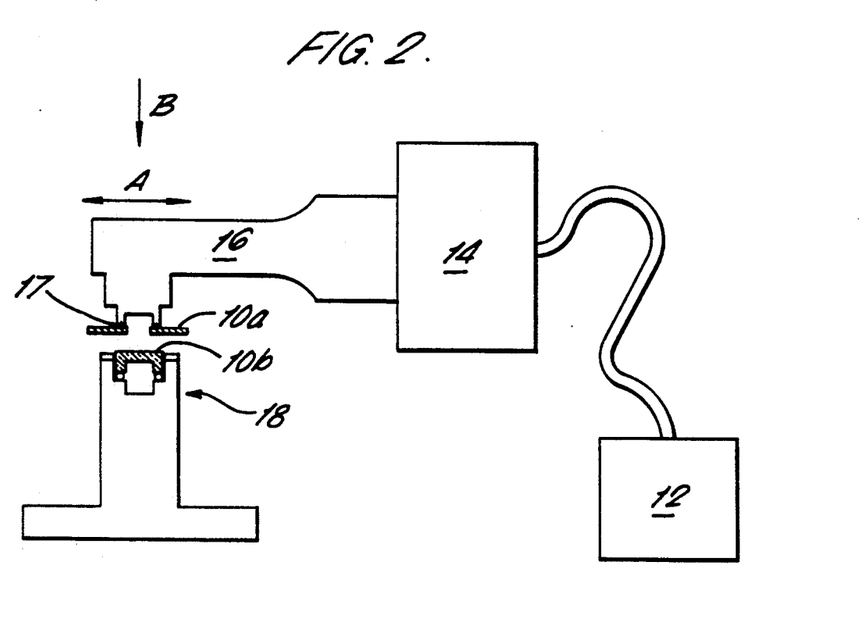
FIG. 2 shows schematically an apparatus for implementing the method of the present invention.

A schematic representation of an apparatus for use in the method of the present invention is shown in FIG. 2. The two members to be ultrasonically welded together, the workpiece, are shown at 10 as two components 10a, 10b. A frequency generator 12, which can provide an output of between 10 and 36 kHz, is used to produce a high frequency output signal ar the desired frequency. This signal is coupled to a piezoelectric crystal 14 which responds by delivering a small amount of movement at a similar frequency to the applied signal. The movement is transmitted to the workpiece 10 by means of a sonotrode 16. The annular sonotrode 16 is of the required size and made of hardened steel, titanium or some other suitable material and is shaped so that the ultrasonic movement (direction indicated by the arrow A) is amplified and then focused at the desired position. The ultrasonic movement is transmitted to the top workpiece 10a by serrations 17 in the sonotrode 16. As the welding load (indicated by the arrow B) is applied to the workpiece 10 the serrations 17 in the surface of the sonotrode embed themselves into the material so transmitting ultrasonic movement to the top component 10a. The bottom component 10b is located on a support 18 shown in more detail in FIG. 3. In contrast to prior art methods proposed for forming an annular weld between two metal parts, in which a torsional driven coupling arrangement has been used to provide a torsional vibratory displacement of the welding tip (serrations) in a plane parallel to the weld interface (between the top and bottom components), the present apparatus uses a laterally driven sonotrode so that the movement of the welding tip relative to the weld interface is non-torsional with only a translational ultrasonic movement being used to generate the weld. This offers the benefit of forming a much lower energy weld due to the absence of torsional losses Alternatively, a torsional ultrasonic welder, in which the sonotrode oscillates and rotates about the axis of applied load, may be used.

Figure 3:
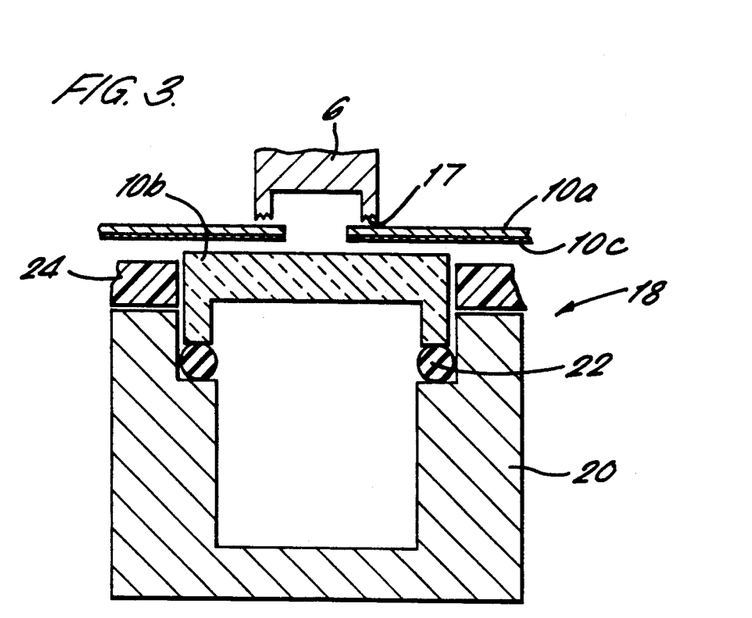
FIG. 3 shows part of the apparatus of FIG. 2 in greater detail.
Figure 4A:
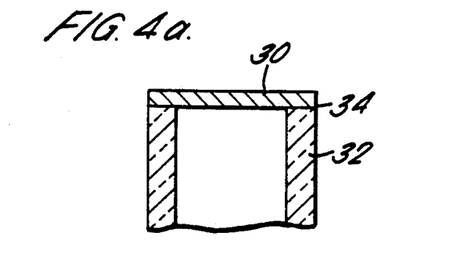
FIGS. 4a through 4i shows a few of the numerous articles which may be produced according to the present invention.
Figure 4B:
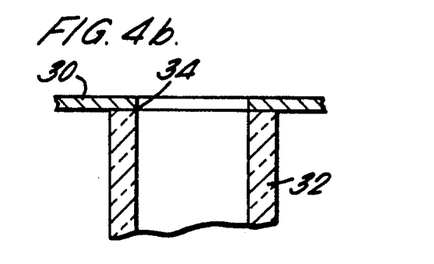
Figure 4C:
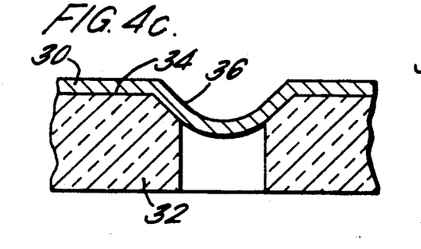
Figure 4D:
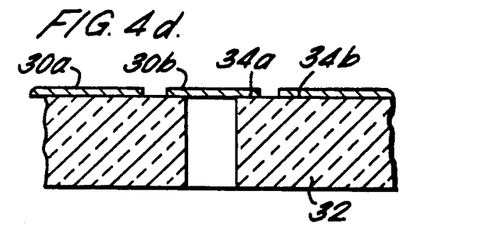
Figure 4E:
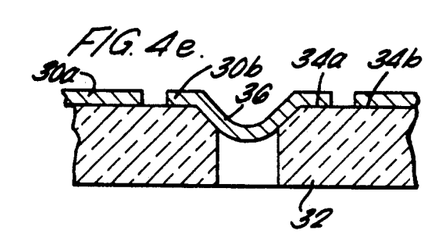
Figure 4F:
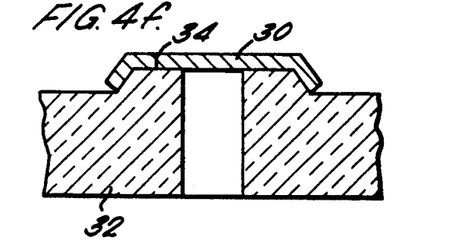
Figure 4G:
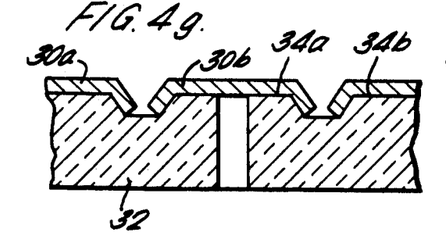
Figure 4H:
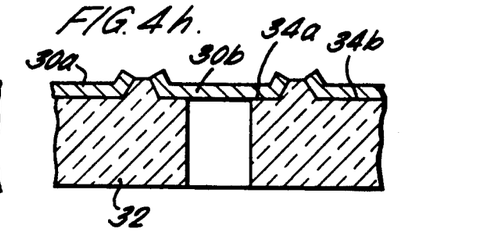
Figure 4I:
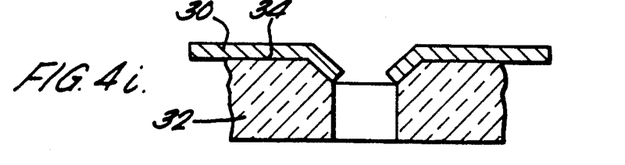

The support 18 includes a metallic support 20. Between the metallic support 20 and the bottom component 10b is advantageously provided a support member 22 made of a material which is resilient, ductile or deformable. Acceptable results have been produced using non-metallic support members 22 manufactured from any combination of plastic and rubber with round or square sections. A non-metallic location device 24, which may be in the form of a three jaw chuck with a plastic tip on each jaw (though it is envisaged that any other such device e.g. a collet, would work equally as well) is positioned on top of the metallic support 20 to surround the bottom component 10b. The support 18 fixes the ceramic component 10b in position so that relative movement can take place between the top and bottom components 10a, 10b during welding. It has been found that, provided the frictional force between the non-metallic support 22 and the bottom component 10b is sufficient to prevent excessive movement of the bottom component 10b during welding, the jaws of the chuck 24 need not be locked around the bottom component 10b during welding but can be used merely to locate the bottom component 10b relative to the top component 10a.

If necessary, the apparatus can be operated with the jaws of the chuck 24 closed so that the bottom component 10b is locked in place relative to the top component 10a. However this can result in minor locational and relative movement problems if rubber is used for the non-metallic support 22. This is due to elastic deformation and recovery of the rubber during the application and removal of the welding load.

The top component 10a is positioned by means of a simple jig or by a pick and place unit (not shown). For certain types of welding initiation, such as when the top component 10a may be subject to excessive movement relative to the bottom component 10b, the use of the jig is preferred. One example of this is implantation type welding in which the sonotrode 16 is vibrating as it comes into contact with the workpiece 10.

The apparatus shown in FIGS. 2 and 3 is used in ultrasonic welding of a top component 10a to a ceramic bottom component 10b. It has been found desirable to support and locate the ceramic component using non-metallic parts as described with reference to FIG. 3 for the following reasons:
1. If the ceramic component is mounted on a metallic fixture of some form, the load required to weld the two components together may result in chipping of the ceramic at the contact points between the ceramic and the metallic support.
2. As ceramics are seldom completely flat in the as—fired condition, applying a load to a ceramic component supported in a metal fixture can result in point loading and ceramic failure. Although this can be overcome by grinding the ceramic component until it is completely flat, this is both time consuming and expensive.
3. It is necessary to fix the ceramic component in position so that relative movement can take place between the top component and the ceramic component during welding. However, it is not possible to use a serrated anvil as in prior art apparatus for ultrasonically welding two metallic components together, because the serrations will not penetrate the ceramic.

The metallic component 10a is a composite formed of at least two components, one being a deformable layer 10c used to effect a weld to the ceramic and the other being a substrate formed of a material that is stronger, harder or tougher, than the first. The layer of deformable material is mechanically fixed in position relative to the substrate member by any of a number of processes such as cold rolling, diffusion bonding, explosive welding, ultrasonic welding or by mechanical or chemical means. The top and bottom components 10a, 10b are positioned relative to one another such that the ceramic member 10b is adjacent the deformable layer (the deformable layer is shown in FIG. 3 at 10c but not to scale). An example of a composite member used is a steel substrate of thickness 0.25 mm on either side of which is solid phase welded a layer of aluminium. (The aluminium provides the deformable layer and is in general required only on the surface of the steel that is to be joined to the ceramic.) Aluminium coatings of thicknesses 25 and 60 microns have been used to produce hermetic seals and it is envisaged that thicknesses of aluminium outside this range, probably up to 150 microns or more, may be used.

The inventors found that composite members formed in this way could be easily ultrasonically welded to a ceramic member to form a totally hermetic seal. It is believed that the steel substrate prevents fatigue cracking. Another reason for the success of this method using the composite member may be that the structure of the composite member as a whole allows the build-up of a higher pressure at the aluminium/ceramic interface during welding than might be otherwise possible. As already indicated, the steel substrate could be replaced by any other material provided this material is tougher or stronger than the aluminium coating Furthermore the commercially pure aluminium used could be replaced by almost any other aluminium alloy.

The person skilled in the art will know the significance of the component shape in the ability to ultrasonically weld metallic components or plastic components together Accordingly, it is appreciated that the shape of the component may be significant in the ultrasonic welding together of metallic and ceramic components. When welding metallic components together, the metallic components may typically split away from the weld area at the edge of the component or at sharp sectional and directional changes in the material. In plastics materials, the plastics may melt instead of splitting. The splitting or melting is caused by a peak in the sinusoidal energy wave coinciding with one of the aforementioned component variations, this resulting in a sudden dissipation of energy at that point. The Inventors have not encountered such severe problems in the ultrasonic welding together of metallic and ceramic components although they have noticed different amounts of energy being absorbed by different shaped or sized components.

With regard to the thickness of the components (i.e. their dimension between the sonotrode and the support member), it is usually stated that the thickness of the bottom component (the ceramic components in the present case) is unimportant while the thickness of the top component should not exceed about 1.5 mm to 2 mm for a frequency generator of power 3 kW. If the top component is too thick, the ultrasonic movement can be absorbed in the material, due to the ductility of the material and the frictional clamping at the interface between the two components, instead of causing movement at the component interface. The Inventors envisage that, in the present case, as the thickness of the aluminium approaches about 200 microns, the composite would be more difficult to weld because the effect of the substrate stiffening would be lost; the ductility of the aluminium would result in the movement being absorbed in the aluminium while the component interface would remain stationary. The Inventors have found that no seal is produced when it is attempted to ultrasonically weld together a ceramic component and a layer of aluminium of thickness 450 microns. It is envisaged that the use of generators of greater power would result in the possibility of being able to weld together thicker materials.

It is believed that the composite members described hereinbefore can be ultrasonically welded to many ceramic materials. One example used is a ceramic generically termed alpha alumina (manufactured by Wades Ceramics under the reference UL300) having the following compositions:

| Material | Percentage |
| --- | --- |
| Alumina | 97.1 |
| Silica | 1.66 |
| Titania | 0.01 |
| Ferric Oxide | 0.08 |
| Lime (CaO) | 1.13 |
| Magnesia | 0.03 |
| Potash | 0.01 |
| Soda | Less than 0.05 |

Another example is a debased alumina (manufactured by Corres Ceramic) believed to have the following composition:

| Material | Percentage |
| --- | --- |
| Silica | 0 to 3.0 |
| Titania | Less than 0.1 |
| Ferric Oxide | Less than 0.2 |
| Lime (CaO) | 0 to 3.0 |
| Magnesia | 0 to 2.0 |
| Potash | Less than 0.1 |
| Soda | Less than 0.3 |
| Alumina | Remainder |

Examples of welding parameters used with the above materials were as follows:

| Parameter | Example 1 | Example 2 |
| --- | --- | --- |
| Generator frequency/kHz | 20 | 20 |
| Seal Area/sq mm | 30 | 40 |
| Welding Load/kg | 69 | 100 |
| Total energy input/Ws | 140 | 320 |
| Weld duration/s | 0.16 | 0.18 |

Using the conditions of the first example, a continuous run of 250 sets of components were ultrasonically welded to produce 250 hermetic assemblies. More variable results were achieved with the conditions of the second example though these variable results may be due to the location and clamping of the components and other variables in the welding procedure. Modifications to these parameters to optimise the process will be apparent to those skilled in the art.

The inventors also tried ultrasonically welding alpha alumina with a number of other metallic members as follows
0.56 mm: thick NS3 aluminium alloy
0.45 mm: thick NS3 alumiumin alloy
0.56 mm: thick commercially pure aluminium
0.45 mm: thick commercially pure aluminium
0.2 mm: thick 99.99% pure aluminium
0.15 mm: thick Inconel 600
0.15 mm: thick Fecralloy "B"
0.075 mm: thick Fecralloy "B"
0.2 mm: thick titanium The inventors found that it was possible to deposit a certain amount of the aluminium alloys onto the ceramic component but that it did not appear possible to form an annular weld region that would be structurally intact, hermetic and complete With the other materials tried, small amounts of metal were abraded on to the surface of the ceramic but no bond of any sort was formed.

These results can be compared with the prior art in which thin metallic foils (of thickness 0.1 mm or less) were ultrasonically welded to ceramic components The inventors found that thicker metallic members could only be ultrasonically welded to ceramic members if the metallic member was in the form of a composite member as described hereinbefore.

FIG. 4 shows a few of the numerous articles formed of metal and ceramic components which may be produced according to the present invention by the exploitation of technology that allows joining and formation of hermetic seals between metals and ceramics. The articles are cylindical in geometry and are shown in part and in section. For simplicity of representation, the layer of deformable metal has not been shown. FIG. 4a shows a metallic disc 30 joined to a ceramic tube 32 by an ultrasonic seal 34. Like parts in the other figures are designated by like references. In FIG. 4b the metallic component is an annular disc. The metallic component of FIG. 4c has been provided with a locational dimple 36 which abuts against the ceramic structure 32 to define the relative location of the two parts. FIG. 4d shows an article with two metallic components 30a, 30b joined to a ceramic tube 32 by respective ultrasonic seals 34a, 34b. In FIG. 4e the central metallic component 30b has been provided with a locational dimple as described hereinbefore. FIGS. 4f, 4g, 4h and 4i all show structures in which the relative positions of the metallic and ceramic components 30, 32 are defined by projections on the metallic component 30 which abut against the sides of recesses or projections in the ceramic structure 32.

Figure 5:
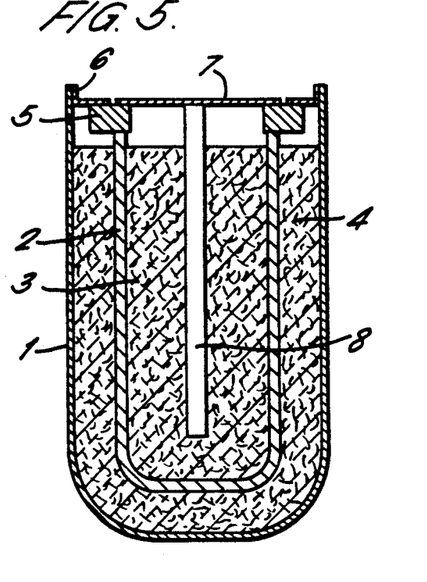
FIGS. 5 to 9 show diagrammatically different constructions of sodium/sulphur cells according to the present invention.
Figure 6:
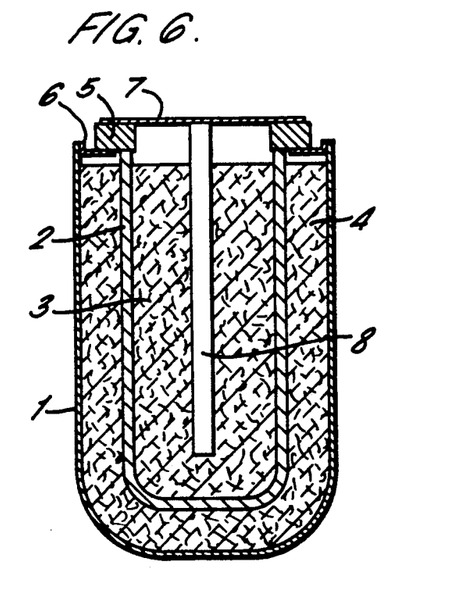
Figure 7:
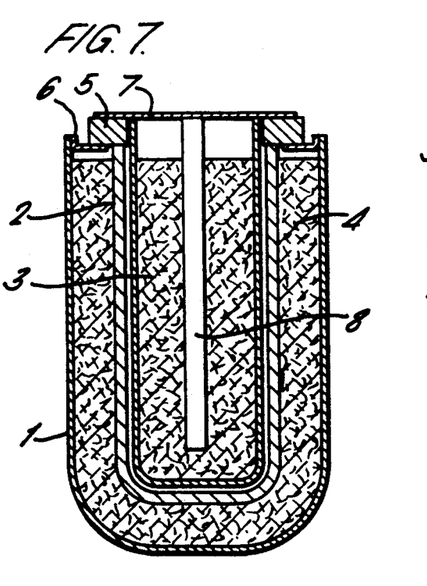
Figure 8:
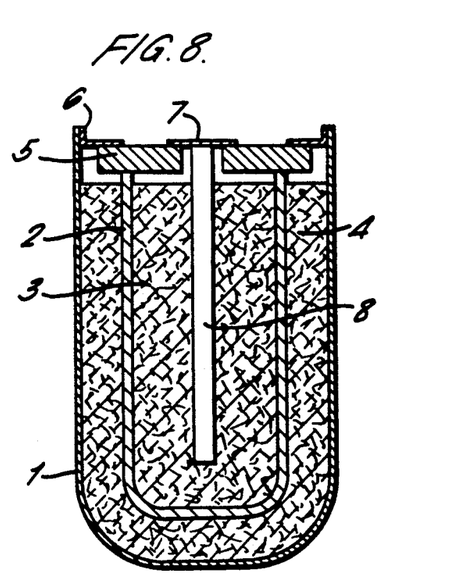

FIGS. 5 to 8 of the drawings show diagrammatically four different constructions of sodium/sulphur cell similar to the cell shown in FIG. 1, which can be readily manufactured using the method of this invention. For simplicity of representation, the layer of deformable metal has nor been shown. Parts of the cells corresponding to parts of the cell of FIG. 1 have the same references. The cell of FIG. 8 is most similar to that of FIG. 1 in that the alpha alumina disc 5 serves for closure of the cup 2, there being only a small hole therein for receiving the current collector 8. In the cells of FIGS. 5 to 7 the terminal disc 7 serves for closure of the cup 2, the alpha alumina member 5 being in the form of a ring secured about the open end of the cup 2 with the discs 6 and 7 secured thereto. In all cells the connections between the alpha alumina member 5 and the metal members 6 and 7 can be made by the method of this invention.

Figure 9:
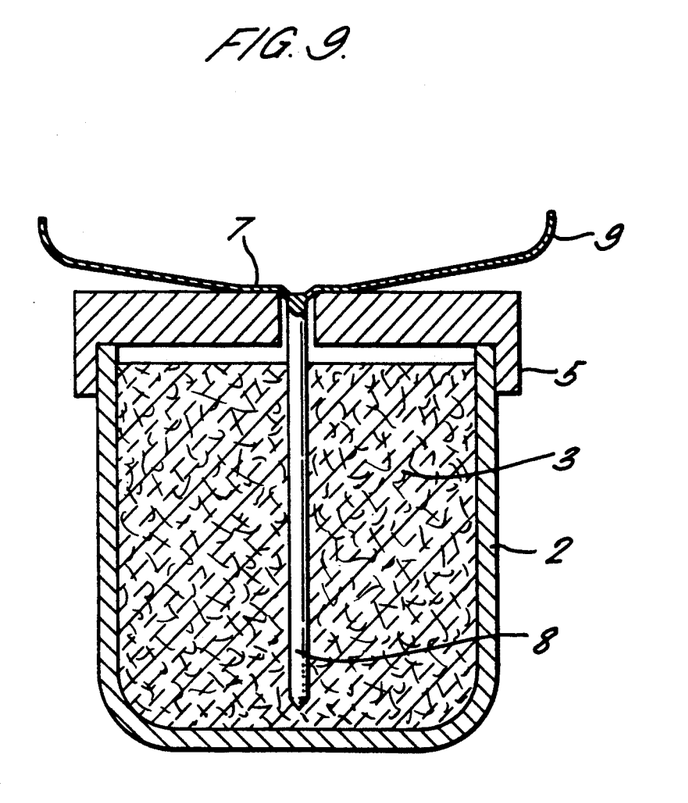

FIG. 9 of the drawings shows the construction of part of another sodium/sulphur cell which can be readily manufactured using the method of this invention.

In this construction the currect collector 8 is initially secured to, or formed integrally with, the terminal disc 7, and the disc 7 is then secured to the alpha alumina member 5 by the method of the invention to seal the electrode compartment 3, with the current collector 8 projecting into the compartment 3 as necessary. As shown the disc 7 can be provided as part of a larger member 9 by which the cell can be connected to other cells, for example as described in WO 89/00344.

An assembly of the construction shown in FIG. 9 offers manufacturing advantages as compared with cells as shown in FIG. 1. These advantages include a reduced number of components which can also be of simpler construction, and the ability to produce the necessary seals at ambient temperature by the method of this invention, after filling of the electrolyte cup 2 with the sodium electrode material.

In the manufacture of the cell of FIG. 1, after the disc 5 has been secured to the cup 2, the terminal disc 7 and sealing disc 6 are secured to the disc 5 by diffusion bonding, the cup 2 filled with sodium (or sulphur), and the current collector 8 then inserted and welded to the terminal disc 7. If, as is generally the case, the cell is to be connected to other cells, then an intercell connection member must then be welded to the terminal disc 7 or the current collector 8.

With such a cell there are four possible failure areas, namely the diffusion bond between disc 5 and the cup 2; the diffusion bond between the disc 5 and the members 6 and 7; the weld between the terminal disc 7 and the current collector 8; failure caused by welding of the cell interconnection member to the terminal disc 7 or current collector 8.

With a cell as shown in FIG. 9, there are only the connections between the disc 5 and the cup 2, between the terminal disc 7 and the disc 5, and possibly between the terminal disc 7 and the current collector 8 which can fail, and as discussed above when the connection between the terminal disc 7 and the disc 5 is made by the method of this invention it is effected at ambient temperature with the consequential less risk of stressing the assembly.

Although in the above description the ceramic member to which a metal member (or members) is bonded is of alpha alumina, it will be appreciated that other ceramic materials can otherwise be used.

The Inventors have also attempted to ultrasonically weld together glass components and metal composite components (as described previously). It was found that if the glass component was too thin, it was susceptible to failure during loading, but it was still found possible to deposit a certain amount of aluminium onto the glass and also to leave areas of glass bonded to the aluminium layer of the composite. It is therefore envisaged that it would be possible to form seals between a composite member (as described previously) and a glassy or vitreous member if the vitreous member was sufficiently thick and sufficiently well supported to withstand the force applied during welding. It was further observed that the maximum power absorbed by a weld using a glass component was much lower than that absorbed by a weld using alpha alumina. This difference is believed to be due to the difference in surface roughness (coefficient of friction) at the weld interface. The maximum power taken from a welding generator during ultrasonic welding depends on the welding load applied, the weld area and the coefficient of friction between components to be welded.

It is further envisaged that ultrasonic welds could be produced between components as described previously in which the substrate of the composite member was formed of any one of the following materials:
aluminium with ceramic reinforcing fibres;
plastic materials;
plastics with metallic, ceramic or glass reinforcing fibres.

As already outlined, the essential feature is that the substrate member is formed of a material which is harder than the deformable metal used.

We claim:

1. An article including a ceramic member and a composite member, said composite member comprising a substrate member and a deformable metal layer mechanically fixed to said substrate member, said substrate member being formed of a material which is harder than said deformable metal layer wherein said ceramic member and said deformable metal layer are hermetically sealed together by a solid phase bond formed by ultrasonic welding.

2. An article according to claim 1 wherein said substrate member is formed of a metal.

3. An article according to claim 2 wherein said substrate member is formed of steel and said deformable metal layer is selected from the group consisting of aluminium and aluminium alloys.

4. An article according to claim 1 wherein said deformable metal layer has a thickness in the range up to and including 450 microns.

5. An article according to claim 4 wherein said deformable metal layer has a thickness in the range up to and including 150 microns.

6. An article according to claim 5 wherein said deformable metal layer has a thickness in the range up to and including 60 microns.

7. An article according to any one of claim 1 wherein said deformable metal layer has a thickness of at least 25 microns.

8. An article according to claim 1 wherein said composite member has a maximum thickness in the range up to and including 2 mm.

9. An article according to claim 1 wherein said composite member is laminar.

10. An article according to claim 1 wherein said ceramic member is formed of alpha alumina.

11. An article according to claim 1 wherein said bond is annular.

12. A method of forming an article including a ceramic member and a composite member, said composite member comprising a substrate member and a deformable metal layer mechanically fixed to said substrate member, said substrate member being formed of a material which is harder than said deformable metal layer, the method comprising the steps of positioning said ceramic member and said composite member relative to one another such that said ceramic member is adjacent said deformable metal layer and a securing said ceramic member and said deformable metal layer together by ultrasonic welding to form a hermetic seal.

13. A method according to claim 12 wherein said substrate member is formed of a metal.

14. A method according to claim 13 wherein said substrate member is formed of steel and said deformable metal layer is formed of a material selected from the group consisting of aluminium and aluminium alloys.

15. A method according to claim 12 wherein the deformable metal layer has a thickness such that said deformable metal is caused to vibrate at an interface between said deformable metal layer and said ceramic member during the ultrasonic welding.

16. A method according to claim 15 wherein said deformable metal layer has a thickness in the range up to and including 450 microns.

17. A method according to claim 16 wherein said deformable metal layer has a thickness up to and including 150 microns.

18. A method according to claim 17 wherein said deformable metal layer has a thickness up to and including 60 microns.

19. A method according to claim 16 wherein said deformable metal layer has a thickness of at least 25 microns.

20. A method according to claim 12 wherein said composite member has a maximum thickness in the range up to and including 2 mm.

21. A method according to claim 12 wherein said composite member is laminar.

22. A method according to claim 12 wherein said ceramic member is formed of alpha alumina.

23. A method according to claim 12 wherein said bond is annular.

24. A sodium/sulphur cell including a ceramic member and a composite member, said composite member comprising a substrate member and a deformable metal layer mechanically fixed to said substrate member, said substrate member being formed of a material which is harder than said deformable metal layer wherein said ceramic member and said deformable metal layer are hermetically sealed together by a solid phase bond formed by ultrasonic welding.

25. A sodium/sulphur cell according to claim 24 further including a solid electrolyte cup, the ceramic member consisting of a ceramic disc closing the open end of the cup; and a current collector extending through the ceramic disc into the cup, said composite member consisting of a terminal member in electrical connection with the current collector, said terminal member and said ceramic disc being bonded together by said solid phase bond.

26. A sodium/sulphur cell according to claim 25 wherein the terminal disc is part of an interconnecting member to serve for connecting the cell to other cells.

27. A sodium/sulphur cell according to claim 25 wherein the terminal disc is formed integrally with the current collector.

28. A sodium/sulphur cell according claim 25 wherein said substrate member is formed of a metal.

29. A sodium/sulphur cell according to claim 28 wherein said substrate member is formed of steel and said deformable metal layer is formed of a corrosion resistant material.

30. A sodium/sulphur cell according to claim 24 wherein said deformable metal layer is formed of a material selected from the group consisting of aluminium and aluminium alloys.

31. A sodium/sulphur cell according to claim 24 wherein said deformable metal layer has a thickness in the range up to and including 450 microns.

32. A sodium/sulphur cell according to claim 31 wherein said deformable metal layer has a thickness in the range up to and including 150 microns.

33. A sodium/sulphur cell according to claim 32 wherein said deformable metal layer has a thickness in the range up to and including 60 microns.

34. A sodium/sulphur cell according claim 31 wherein said deformable metal layer has a thickness of at least 25 microns 35. A sodium/sulphur cell according to claims 28 to 24, wherein said composite member has a maximum thickness the range up to and including 2 mm.

36. A sodium/sulphur cell according to claim 24 wherein said ceramic member is formed of alpha alumina.

37. A sodium/sulphur cell according to claim 24 wherein said bond is annular.

38. A method of manufacturing a sodium/sulphur cell including a ceramic member and a composite member, said composite member comprising a substrate member and a deformable metal layer mechanically fixed to said substrate member, said substrate member being formed of a material which is harder than said deformable metal layer, the method comprising the steps of positioning said ceramic member and said composite member relative to one another such that said ceramic member is adjacent said deformable metal layer and securing said ceramic member and said deformable metal layer together by ultrasonic welding to produce a hermetic seal.

39. A method according to claim 38 wherein said substrate member is formed of a metal.

40. A method according to claim 39 wherein said substrate member is formed of steel and said deformable metal layer is formed of a corrosion resistant material.

41. A method according to claim 38 wherein said deformable metal layer is formed of a material selected from the group consisting of aluminium and aluminium alloys.

42. A method according to claim 38 wherein said deformable metal layer has a thickness such that said deformable metal is caused to vibrate at an interface between said deformable metal layer and said ceramic member during the ultrasonic welding.

43. A method according to claim 42 wherein said deformable metal layer has a thickness in the range up to and including 450 microns.

44. A method according to claim 43 wherein said deformable metal layer has a thickness in the range up to and including 150 microns.

45. A method according to claim 44 wherein said deformable metal layer has a thickness in the range up to and including 150 microns.

46. A method according to claim 43 wherein said deformable metal layer has a thickness of at least 25 microns.

47. A method according to claim 38 wherein said composite member has a maximum thickness in the range up to and including 2 mm.

48. A method according to claim 38 wherein said ceramic member is formed of alpha alumina.

49. A method according to claim 38 wherein said bond is annular.

50. An apparatus for manufacturing an article including a ceramic member and a composite member, said composite member comprising a substrate member and a deformable metal layer mechanically fixed to said substrate member, said substrate member being formed of a material which is harder than said deformable metal layer, the apparatus including means for positioning said ceramic member and said composite member relative to one another such that said ceramic member is adjacent said deformable metal layer, said means for positioning including a deformable support member for holding said ceramic member, and means for transmitting energy at an ultrasonic frequency to said deformable metal layer through said substrate member whereby a solid phase bond is formed between said ceramic member and said deformable metal layer.

* * * * *

UNITED STATES PATENT AND TRADEMARK OFFICE
CERTIFICATE OF CORRECTION

PATENT NO. : 5,270,135
DATED : December 14, 1993
INVENTOR(S) : O'Neil-Bell et al.

It is certified that error appears in the above-indentified patent and that said Letters Patent is hereby corrected as shown below:

Claim 7, column 10, line 43, delete "any one of".

Claim 35, column 12, lines 10-11, "claims 28 to 24" should read --claim 24--; and line 12, insert --in-- after "thickness".

Signed and Sealed this

Tenth Day of May, 1994

Attest:

BRUCE LEHMAN

Attesting Officer

Commissioner of Patents and Trademarks